United States Patent
Wang

(10) Patent No.: US 9,565,515 B2
(45) Date of Patent: Feb. 7, 2017

(54) METHOD AND APPARATUS FOR INFORMATION EXCHANGE, AND DELIVERY TERMINAL

(71) Applicant: ANHUI HUAMI INFORMATION TECHNOLOGY CO., LTD., Hefei, Anhui (CN)

(72) Inventor: Hui Wang, Hefei (CN)

(73) Assignee: Anhui Huami Information Technology Co., Ltd., Hefei, Anhui (CN)

( * ) Notice: Subject to any disclaimer, the term of this patent is extended or adjusted under 35 U.S.C. 154(b) by 0 days.

(21) Appl. No.: 14/799,802

(22) Filed: Jul. 15, 2015

(65) Prior Publication Data

US 2016/0105760 A1    Apr. 14, 2016

(30) Foreign Application Priority Data

Oct. 14, 2014 (CN) .......................... 2014 1 0541811

(51) Int. Cl.
 H04W 4/00    (2009.01)
 H04L 29/06   (2006.01)

(52) U.S. Cl.
 CPC .............. H04W 4/008 (2013.01); *H04L 69/22* (2013.01)

(58) Field of Classification Search
 CPC ....... H04W 4/008; H04W 84/18; H04L 69/22; H04M 1/7253
 USPC ...................................................... 455/41.2
 See application file for complete search history.

(56) References Cited

U.S. PATENT DOCUMENTS

| | | | | |
|---|---|---|---|---|
| 6,021,362 A * | 2/2000 | Maggard | ............... | G06Q 20/387 235/375 |
| 6,084,528 A * | 7/2000 | Beach | .................... | G06K 17/00 235/383 |
| 6,636,151 B2 * | 10/2003 | Busick | ................. | B67D 3/0032 222/146.1 |
| 7,022,017 B1 * | 4/2006 | Halbritter | .............. | G06Q 10/06 463/25 |
| 7,051,120 B2 * | 5/2006 | Greene | ................ | A61B 5/0002 600/301 |
| 7,137,549 B2 * | 11/2006 | Silverbrook | ............ | G06F 3/014 235/375 |
| 7,216,109 B1 * | 5/2007 | Donner | .................. | G06Q 10/02 235/382 |
| 7,342,510 B2 * | 3/2008 | Pate | ........................ | G09F 19/22 116/63 P |
| 7,693,744 B2 * | 4/2010 | Forbes | ................... | G06Q 30/02 705/14.64 |

(Continued)

*Primary Examiner* — Hat V Nguyen
(74) *Attorney, Agent, or Firm* — Young Basile Hanlon & MacFarlane, P.C.

(57) ABSTRACT

A method and apparatus for information exchange, and a delivery terminal. A broadcast packet is received, which is periodically sent by a smart wearable device through short-range wireless communication, and the broadcast packet includes a delivery identifier of a commodity purchased by a user. The broadcast packet is parsed to obtain the delivery identifier. The delivery identifier is sent to a network side, so that the network side validates the delivery identifier. When the delivery identifier is valid, commodity information corresponding to the delivery identifier is acquired. A commodity is dispensed corresponding to the commodity information. A user who purchases a commodity online can pick up the commodity from a delivery terminal in a self-service manner.

7 Claims, 3 Drawing Sheets

(56) References Cited

U.S. PATENT DOCUMENTS

| | | | |
|---|---|---|---|
| 7,797,204 B2* | 9/2010 | Balent | G06Q 10/087 705/26.8 |
| 7,974,873 B2* | 7/2011 | Simmons | G06Q 10/06313 455/12.1 |
| 8,216,049 B2* | 7/2012 | Fisk | G07F 17/32 463/16 |
| 8,341,027 B2* | 12/2012 | Yeung | G06Q 30/018 235/379 |
| 8,348,149 B1* | 1/2013 | Boudville | G06Q 10/10 235/375 |
| 8,395,658 B2* | 3/2013 | Corson | G06F 3/0428 348/47 |
| 8,689,247 B2* | 4/2014 | Lo | G06Q 30/02 725/31 |
| 8,780,810 B2* | 7/2014 | Ryu | H04W 74/0833 370/328 |
| 8,949,146 B2* | 2/2015 | Fisher | G06Q 10/02 705/26.1 |
| 9,100,675 B2* | 8/2015 | Gillies | G06Q 30/02 |
| 9,129,294 B2* | 9/2015 | Yahn | G06Q 20/0237 |
| 9,147,191 B2* | 9/2015 | Cohen | G06F 21/33 |
| 9,159,080 B2* | 10/2015 | Fiorucci | G06Q 30/0226 |
| 9,258,385 B2* | 2/2016 | Neo | G06F 8/61 |
| 2001/0018660 A1* | 8/2001 | Sehr | G06Q 10/02 705/5 |
| 2002/0050526 A1* | 5/2002 | Swartz | G06K 17/00 235/472.02 |
| 2002/0101346 A1* | 8/2002 | Busick | B67D 3/0032 340/521 |
| 2002/0107610 A1* | 8/2002 | Kaehler | G06Q 20/387 700/232 |
| 2004/0006497 A1* | 1/2004 | Nestor | G06Q 10/02 705/5 |
| 2004/0049412 A1* | 3/2004 | Johnson | G06Q 10/02 705/5 |
| 2004/0083380 A1* | 4/2004 | Janke | G06K 19/073 713/194 |
| 2004/0195311 A1* | 10/2004 | Silverbrook | G06F 3/014 235/375 |
| 2006/0089914 A1* | 4/2006 | Shiel | G06Q 30/00 705/52 |
| 2006/0205477 A1* | 9/2006 | Fisk | G07F 17/32 463/17 |
| 2007/0125620 A1* | 6/2007 | Sorenson | G06Q 20/123 194/217 |
| 2008/0052192 A1* | 2/2008 | Fisher | G06Q 10/02 705/5 |
| 2008/0062257 A1* | 3/2008 | Corson | G06F 3/0428 348/47 |
| 2008/0116264 A1* | 5/2008 | Hammad | G06Q 20/045 235/382 |
| 2008/0148637 A1* | 6/2008 | Pate | G09F 19/22 49/49 |
| 2008/0201212 A1* | 8/2008 | Hammad | G06Q 20/045 705/13 |
| 2008/0208681 A1* | 8/2008 | Hammad | G06Q 20/045 705/13 |
| 2008/0235108 A1* | 9/2008 | Kulakowski | G06Q 10/02 705/5 |
| 2008/0294556 A1* | 11/2008 | Anderson | G06Q 20/40 705/44 |
| 2009/0125387 A1* | 5/2009 | Mak | G06Q 10/02 705/14.73 |
| 2009/0147684 A1* | 6/2009 | Majidi-Ahy | H04L 12/66 370/236 |
| 2009/0228325 A1* | 9/2009 | Simmons | G06Q 10/06313 705/7.23 |
| 2009/0254930 A1* | 10/2009 | Lo | G06Q 30/02 725/2 |
| 2010/0061294 A1* | 3/2010 | Proctor, Jr. | G06Q 30/0623 370/328 |
| 2010/0105375 A1* | 4/2010 | Schroter | H04L 63/0853 455/419 |
| 2010/0122274 A1* | 5/2010 | Gillies | G06Q 30/02 725/2 |
| 2010/0146559 A1* | 6/2010 | Lee | H04L 12/1822 725/61 |
| 2010/0268659 A1* | 10/2010 | Zimberoff | G06Q 10/08 705/336 |
| 2011/0026503 A1* | 2/2011 | Mueck | H04W 48/10 370/338 |
| 2011/0231292 A1* | 9/2011 | McCown | G06Q 20/223 705/27.1 |
| 2011/0243053 A1* | 10/2011 | Tinnakornsrisuphap | H04L 12/189 370/312 |
| 2012/0023089 A1* | 1/2012 | Chandra | G06F 17/30899 707/709 |
| 2012/0029990 A1* | 2/2012 | Fisher | G06Q 20/105 705/14.19 |
| 2012/0084222 A1* | 4/2012 | Zimberoff | G06Q 10/08 705/330 |
| 2012/0091202 A1* | 4/2012 | Cohen | G06F 21/33 235/382 |
| 2012/0129608 A1* | 5/2012 | Stegman | G07F 17/3234 463/42 |
| 2012/0203572 A1* | 8/2012 | Christensen | G06Q 30/02 705/3 |
| 2013/0017880 A1* | 1/2013 | Fisk | G07F 17/32 463/19 |
| 2013/0039309 A1* | 2/2013 | Chiu | H04W 74/0833 370/329 |
| 2013/0060618 A1* | 3/2013 | Barton | G06Q 20/3674 705/14.23 |
| 2013/0066660 A1* | 3/2013 | Kopitzke | G06Q 10/02 705/5 |
| 2013/0090594 A1* | 4/2013 | Palmer | A61J 7/0053 604/60 |
| 2013/0097079 A1* | 4/2013 | Bruder | G06Q 20/425 705/44 |
| 2013/0107778 A1* | 5/2013 | Ryu | H04W 48/02 370/311 |
| 2013/0119129 A1* | 5/2013 | Amdahl | G06Q 20/385 235/381 |
| 2013/0173402 A1* | 7/2013 | Young | G06Q 30/0631 705/14.73 |
| 2013/0217336 A1* | 8/2013 | McCormack | H04W 8/085 455/41.2 |
| 2013/0242262 A1* | 9/2013 | Lewis | G02B 27/0093 351/209 |
| 2013/0282169 A1* | 10/2013 | Moore | G07F 7/00 700/235 |
| 2014/0025573 A1* | 1/2014 | Keronen | G06Q 20/322 705/41 |
| 2014/0036669 A1* | 2/2014 | Yang | H04N 21/2365 370/230 |
| 2014/0099912 A1* | 4/2014 | Lee | H04W 48/08 455/404.1 |
| 2014/0108260 A1* | 4/2014 | Poole | G06Q 20/3226 705/64 |
| 2014/0114780 A1* | 4/2014 | Menefee | G06Q 20/20 705/21 |
| 2014/0138435 A1* | 5/2014 | Khalid | G06Q 20/227 235/380 |
| 2014/0179233 A1* | 6/2014 | Kang | H04L 67/16 455/41.2 |
| 2014/0188637 A1* | 7/2014 | Balasubramaniam | G06Q 50/12 705/15 |
| 2014/0228783 A1* | 8/2014 | Kraft | A61F 9/0008 604/300 |
| 2014/0278508 A1* | 9/2014 | Akdogan | G07F 9/026 705/2 |
| 2014/0279541 A1* | 9/2014 | Castrechini | G06Q 20/3274 705/44 |
| 2015/0003320 A1* | 1/2015 | Anderson | H04W 12/06 370/328 |

(56) References Cited

U.S. PATENT DOCUMENTS

| | | | |
|---|---|---|---|
| 2015/0079938 A1* | 3/2015 | Jung | H04W 48/06 455/411 |
| 2015/0105901 A1* | 4/2015 | Joshi | G06Q 20/18 700/232 |
| 2015/0106296 A1* | 4/2015 | Robinson | G06F 21/62 705/339 |
| 2015/0135328 A1* | 5/2015 | Ellis | G06Q 10/10 726/26 |
| 2015/0206130 A1* | 7/2015 | Fisher | G06Q 10/02 705/44 |
| 2015/0278431 A1* | 10/2015 | Hyde | G06F 19/3475 707/738 |
| 2015/0278480 A1* | 10/2015 | Hyde | G06F 19/322 700/233 |
| 2015/0279147 A1* | 10/2015 | Illingworth | G07F 11/002 700/232 |
| 2015/0279177 A1* | 10/2015 | Hyde | G06F 19/345 340/815.4 |
| 2015/0279178 A1* | 10/2015 | Hyde | G06F 19/345 340/815.4 |
| 2015/0279199 A1* | 10/2015 | Yarkoni | G08B 25/016 340/539.11 |
| 2015/0294394 A1* | 10/2015 | Shreve | G06Q 30/0635 705/26.81 |
| 2015/0302376 A1* | 10/2015 | Fisher | G06Q 10/02 705/21 |
| 2015/0309156 A1* | 10/2015 | Chua | G06K 7/10009 342/451 |
| 2015/0343144 A1* | 12/2015 | Altschul | A61K 45/06 604/503 |
| 2015/0347930 A1* | 12/2015 | Cohen | G06F 21/33 705/5 |
| 2015/0356548 A1* | 12/2015 | Luna-Rodriguez | H04W 4/02 705/39 |
| 2016/0012205 A1* | 1/2016 | Saint | A61M 5/31528 604/154 |
| 2016/0012465 A1* | 1/2016 | Sharp | G06Q 20/18 705/14.17 |

* cited by examiner

METHOD AND APPARATUS FOR INFORMATION EXCHANGE, AND DELIVERY TERMINAL

CROSS-REFERENCE TO RELATED APPLICATION

This application claims priority to Chinese patent application no. CN 201410541811.2, filed Oct. 14, 2014, which is incorporated herein in its entirety by reference.

TECHNICAL FIELD

The present disclosure relates to the technical field of wireless communications, and more particularly to a method and apparatus for information exchange, and a delivery terminal.

BACKGROUND

With the development of technologies, mobile presence and internet interaction have become part of daily life. For example, a user can purchase a commodity online through the Internet, and pick up the commodity offline from a physical automated teller machine later. In one example, a user purchases a commodity or service such as a movie ticket online through the Internet, and obtains a delivery code after the purchase is completed. Then, the user inputs the delivery code into a physical teller machine, such as an automated ticket machine at a cinema, and can pick up the purchased commodity such as a movie ticket offline from the automated teller machine. The "delivery code" for the user can be a string of digits or a two-dimensional code. This allows the user to purchase a movie ticket without having to queue up at the cinema.

SUMMARY

For hot commodities (for example, hot movies), input of a delivery code such as a string of digits or a two-dimensional code, which is often based on starting of an APP to photograph the two-dimensional code, can create a new bottleneck, queue up and degrade the user experience. For example, when the delivery code is a string of digits, it can be rather inconvenient for a user to input the digits into the automated teller machine, as the string is often long and requires much time to input, and errors can easily occur during input of the digits. When the delivery code is a two-dimensional code, reading or parsing of the two-dimensional code can involve additional steps. For example, a mobile phone needs to be started to run a particular application in order to photograph or scan the two-dimensional code.

Implementations of the present disclosure provide method and apparatus for information exchange, and a delivery terminal. A first aspect of the implementations of the present disclosure provides an information exchange method for a delivery terminal. The method includes receiving a broadcast packet that is periodically sent by a smart wearable device through short-range wireless communication, where the broadcast packet includes a delivery identifier of a commodity purchased by a user. The method further includes parsing the broadcast packet to obtain the delivery identifier, sending the delivery identifier to a network side for invalidation, acquiring commodity information corresponding to the delivery identifier when the delivery identifier is valid, and dispensing a commodity corresponding to the commodity information.

In one implementation, the operation of picking up a commodity from a delivery terminal can be completed by using a smart wearable device. Since the user does not need to manually input a string of digits, errors caused by manual input can be avoided, and the time required for pickup is reduced. Since no two-dimensional code needs to be photographed or scanned, the user does not need to start a mobile phone to run a particular application during pickup, so the time required for pickup is reduced. The operations of purchasing a commodity online through the Internet and picking up the commodity offline can be therefore simplified to save time for the user and improve the user experience.

Optionally, the receiving a broadcast packet periodically sent by a smart wearable device through short-range wireless communication includes receiving a broadcast packet periodically sent by a smart wearable device within a preset location range through short-range wireless communication, and blocking a broadcast packet that is sent by a smart wearable device outside the preset location range.

Optionally, the delivery terminal is provided with a particular space, such as a dispensing slot, to allow the user to put a hand, such as one wearing the smart wearable device, into the dispensing slot. In this way, other wearable devices nearby can be blocked, so that the delivery identifier carried in the smart wearable device (such as a wristband) in the dispensing slot can be accurately read.

Optionally, the dispensing a commodity corresponding to the commodity information includes dispensing the commodity corresponding to the commodity information within the preset location range.

In an optional solution, the user puts the hand wearing the smart wearable device into the dispensing slot, and a Bluetooth reading device in the dispensing slot quickly acquires the broadcast packet sent by the smart wearable device, so as to obtain the delivery identifier. The delivery terminal sends the delivery identifier to a server on the network side to validate the delivery identifier and determine a commodity purchased by the user, and directly releases the commodity from the dispensing slot. Then, the user uses the hand in the dispensing slot to pick up the commodity, which completes the pickup process.

Optionally, the smart wearable device periodically sends the broadcast packet via Bluetooth.

A second aspect of the implementations of the present disclosure provides an information exchange apparatus, applied in a delivery terminal. The apparatus includes a receiving module, for receiving a broadcast packet that is periodically sent by a smart wearable device through short-range wireless communication, where the broadcast packet includes a delivery identifier of a commodity purchased by a user. The apparatus also includes a parsing module for parsing the broadcast packet to obtain the delivery identifier, a sending module for sending the delivery identifier to a network side for validating the delivery identifier, an acquiring module for acquiring commodity information corresponding to the delivery identifier when the delivery identifier is valid, and a dispensing module for dispensing a commodity corresponding to the commodity information.

Optionally, the receiving module is used for receiving a broadcast packet that is periodically sent by a smart wearable device within a preset location range through short-range wireless communication, and blocking a broadcast packet that is sent by a smart wearable device outside the preset location range.

Optionally, the dispensing module is used for dispensing the commodity corresponding to the commodity information within the preset location range.

A third aspect of the implementations of the present disclosure provides a delivery terminal including a receiver, for receiving a broadcast packet that is periodically sent by a smart wearable device through short-range wireless communication, where the broadcast packet includes a delivery identifier of a commodity purchased by a user. The delivery terminal includes a processor configured to execute instructions to parse the broadcast packet to obtain the delivery identifier, send the delivery identifier to a network side for validation, and acquire commodity information corresponding to the delivery identifier when the delivery identifier is valid. The delivery terminal includes a dispensing slot for dispensing a commodity corresponding to the commodity information.

Optionally, the receiver is located in the dispensing slot. When the smart wearable device is located in the dispensing slot, the receiver receives the broadcast packet sent by the smart wearable device, and blocks a broadcast packet sent by a smart wearable device outside the dispensing slot.

It should be understood that the foregoing general description and the following detailed description are just examples for explanatory purposes, and are not intended to limit the present disclosure.

BRIEF DESCRIPTION OF THE DRAWINGS

The drawings herein accompany this specification as part thereof, show implementations consistent with the present disclosure, and are used for explaining the principle of the present disclosure together with this specification.

DETAILED DESCRIPTION

Certain implementations are described in detail herein with reference to examples shown in the accompanying drawings. When the following description is made with reference to the accompanying drawings, unless otherwise indicated, same numerals in different drawings represent same or similar elements. Implementations described in the following exemplary implementations do not represent all implementations consistent with the present disclosure. On the contrary, they are merely examples of apparatuses and methods as detailed in the claims and are consistent with some aspects of the present disclosure.

Figure 1:
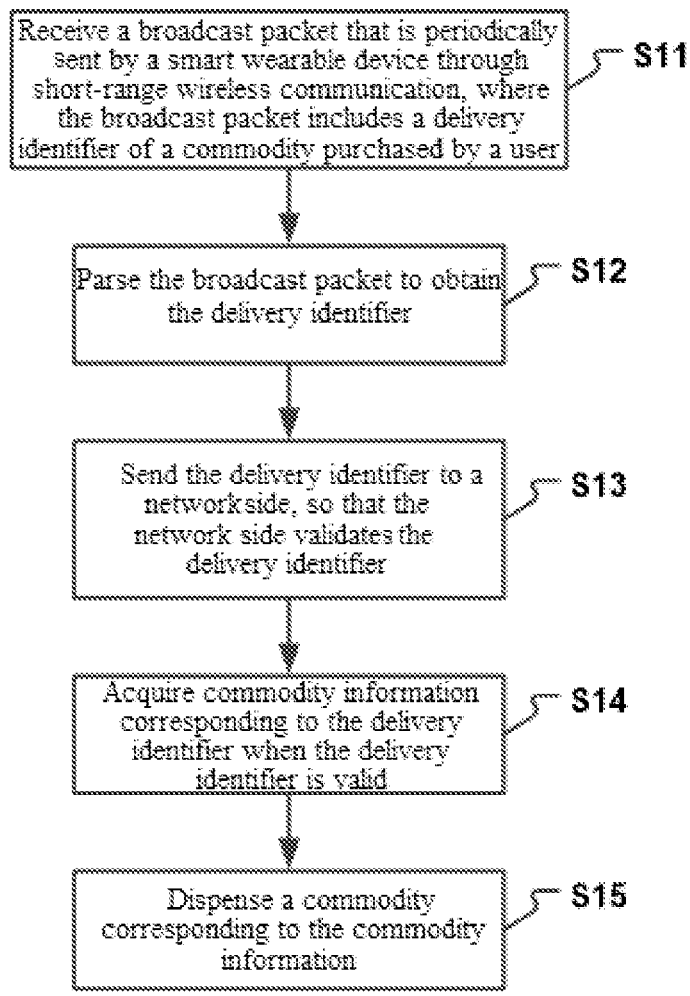
FIG. 1 is a flowchart of an information exchange method according to an implementation of the present disclosure.

FIG. 1 is a flowchart of an information exchange method according to an implementation of the present disclosure. As shown in FIG. 1, the information exchange method can be applied in a delivery terminal, for example, a movie ticket pickup terminal, and can include the following steps S11 to S15.

At Step S11, a broadcast packet periodically sent by a smart wearable device through short-range wireless communication is received, where the broadcast packet includes a delivery identifier of a commodity purchased by a user.

At Step S12, the broadcast packet is parsed to obtain the delivery identifier.

At Step S13, the delivery identifier is sent to a network side, so that the network side validates the delivery identifier.

At Step S14, commodity information corresponding to the delivery identifier is acquired based on a determination that the delivery identifier is valid.

At Step S15, a commodity is dispensed corresponding to the commodity information.

In this implementation, the operation of picking up a commodity from a delivery terminal can be completed by using a smart wearable device, and since the user does not need to manually input a string of digits, errors caused by manual input can be avoided, and the time required for pickup can be reduced. Since no two-dimensional code needs to be photographed or scanned, the user also does not need to start a mobile phone to run a particular application during pickup. Thus, the operations of purchasing and paying for a commodity online through the Internet and picking up the commodity offline can be simplified, which saves time for the user, thereby improving the user experience.

Optionally, the step S11 includes receiving a broadcast packet that is periodically sent by a smart wearable device within a preset location range through short-range wireless communication, and blocking a broadcast packet that is sent by a smart wearable device outside the preset location range.

In an optional solution, the delivery terminal is provided with a particular space, e.g., a dispensing slot, which allows the user to put a hand wearing the smart wearable device into the dispensing slot. In this way, other wearable devices nearby can be blocked, so that the delivery identifier carried in the wristband that is put into the dispensing slot can be accurately read.

Optionally, the step S15 includes dispensing the commodity corresponding to the commodity information within the preset location range.

In an optional solution, the user puts the hand wearing the smart wearable device into the dispensing slot, and a Bluetooth reading device in the dispensing slot quickly acquires the broadcast packet sent by the smart wearable device, so as to obtain the delivery identifier. The delivery terminal sends the delivery identifier to a server on the network side to validate the delivery identifier and determine a commodity purchased by the user. Then, the delivery terminal directly releases the commodity from the dispensing slot, and the user uses the hand in the dispensing slot to pick up the commodity, thereby completing the pickup process.

Optionally, the smart wearable device periodically sends the broadcast packet via Bluetooth. For example, the smart wearable device is provided with a low power Bluetooth chip. The Bluetooth chip operates in Bluetooth low energy (BLE) mode and is internally controlled by a controller to periodically send a broadcast packet. If the user purchases an article or service, the periodical broadcast packet contains a "delivery code" (e.g., marked as S) of the article or service.

Figure 2:
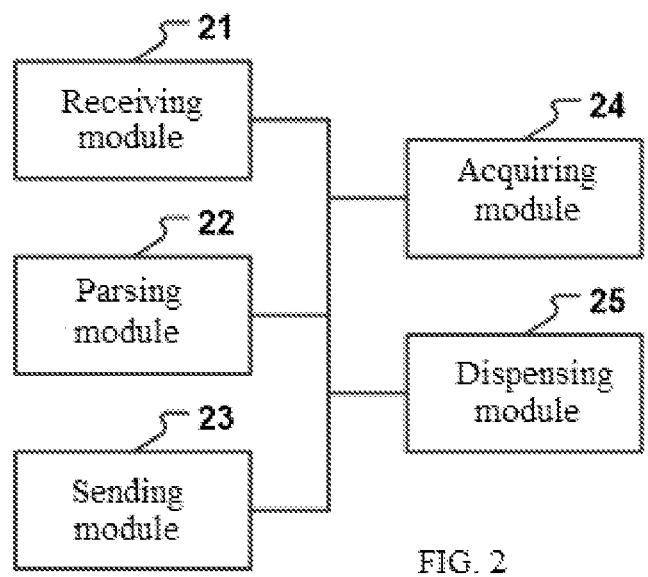
FIG. 2 is a block diagram of an information exchange apparatus according to an implementation of the present disclosure.

FIG. 2 is a block diagram of an information exchange apparatus according to an implementation of the present disclosure. As shown in FIG. 2, the apparatus includes a receiving module 21, a parsing module 22, a sending module 23, an acquiring module 24, and a dispensing module 25. Modules 21 to 25 can be implemented by software, or hardware, or an implementation combining software and hardware aspects.

The receiving module 21 is configured to receive a broadcast packet that is periodically sent by a smart wearable device through short-range wireless communication, where the broadcast packet includes a delivery identifier of a commodity purchased by a user.

The parsing module 22 is configured to parse the broadcast packet to obtain the delivery identifier.

The sending module 23 is configured to send the delivery identifier to a network side, so that the network side validates the delivery identifier.

The acquiring module 24 is configured to acquire commodity information corresponding to the delivery identifier when the delivery identifier is valid.

The dispensing module 25 is configured to dispense a commodity corresponding to the commodity information.

Optionally, the receiving module 21 is configured to receive a broadcast packet that is periodically sent by a smart wearable device within a preset location range through short-range wireless communication, and block a broadcast packet that is sent by a smart wearable device outside the preset location range.

Optionally, the dispensing module 23 is configured to dispense the commodity corresponding to the commodity information within the preset location range.

The specific manners in which the modules in the apparatus in this implementation perform the operations have been described in detail in the related method implementation, and the details will be not repeatedly described herein again.

Figure 3:
FIG. 3 is a block diagram of a delivery terminal according to an implementation of the present disclosure.

FIG. 3 is a block diagram of a delivery terminal according to an implementation of the present disclosure. As shown in FIG. 3, the delivery terminal includes a receiver 31, for receiving a broadcast packet that is periodically sent by a smart wearable device through short-range wireless communication, where the broadcast packet includes a delivery identifier of a commodity purchased by a user. The delivery terminal further includes a processor 32, for parsing the broadcast packet to obtain the delivery identifier and sending the delivery identifier to a network side (e.g., server), so that the network side validates the delivery identifier. The processor 32 is further configured to acquire commodity information corresponding to the delivery identifier based on a determination that the delivery identifier is valid. The delivery terminal further includes a dispensing slot 33, for dispensing a commodity corresponding to the commodity information.

Optionally, the receiver 31 is located in the dispensing slot 33. When the smart wearable device is located in the dispensing slot 33, the receiver 31 receives the broadcast packet sent by the smart wearable device, and blocks a broadcast packet sent by a smart wearable device (e.g., another smart wearable device) outside the dispensing slot 33.

The following example describes in detail below an ordered movie ticket being picked up from an automated ticket machine using a smart wristband.

Figure 4:
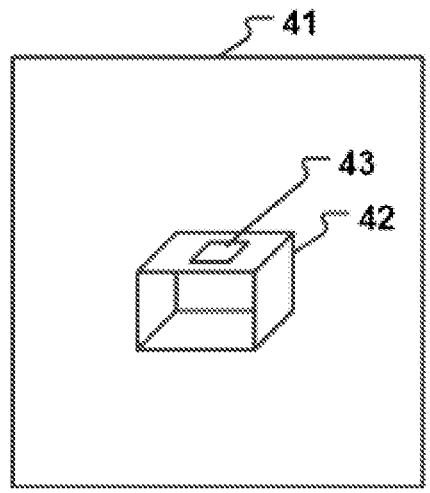
FIG. 4 is a block diagram of an automated ticket machine according to an implementation of the present disclosure.

As shown in FIG. 4, an automated ticket machine 41 is provided with a ticket dispensing slot 42, allowing a user to put a hand into the ticket dispensing slot 42. A Bluetooth signal receiver 43 capable of obtaining Bluetooth broadcast information transmitted from a smart wristband worn by the user is provided in the ticket dispensing slot 42. By using the ticket dispensing slot 42, signals of other smart wristbands can be blocked, and only Bluetooth signals of the smart wristband currently in the ticket dispensing slot 42 is read.

Figure 5:
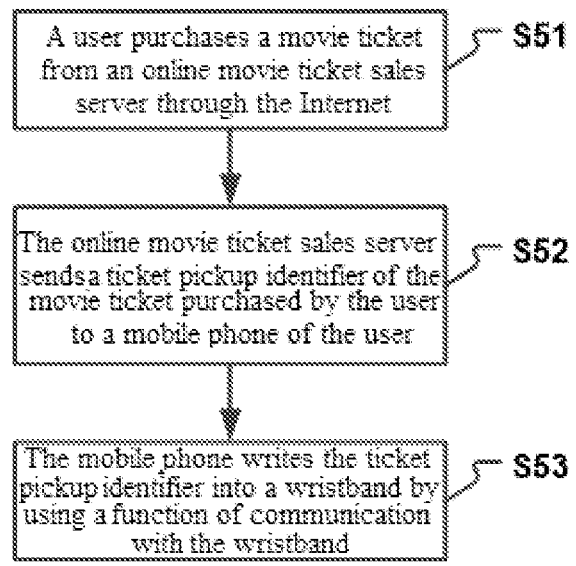
FIG. 5 is a flowchart of writing a ticket pickup identifier into a wristband according to an implementation of the present disclosure.

As shown in FIG. 5, after a user purchases a movie ticket through the Internet, a ticket pickup identifier can be written into a wristband by using a mobile phone, which includes the following steps S51-S53.

At Step S51, a user purchases a movie ticket from an online movie ticket sales server through the Internet.

At Step S52, the online movie ticket sales server sends a ticket pickup identifier of the movie ticket purchased by the user to a mobile phone of the user.

At Step S53, the mobile phone writes the ticket pickup identifier into a wristband by using a function of communication with the wristband, for example, via Bluetooth.

Figure 6:
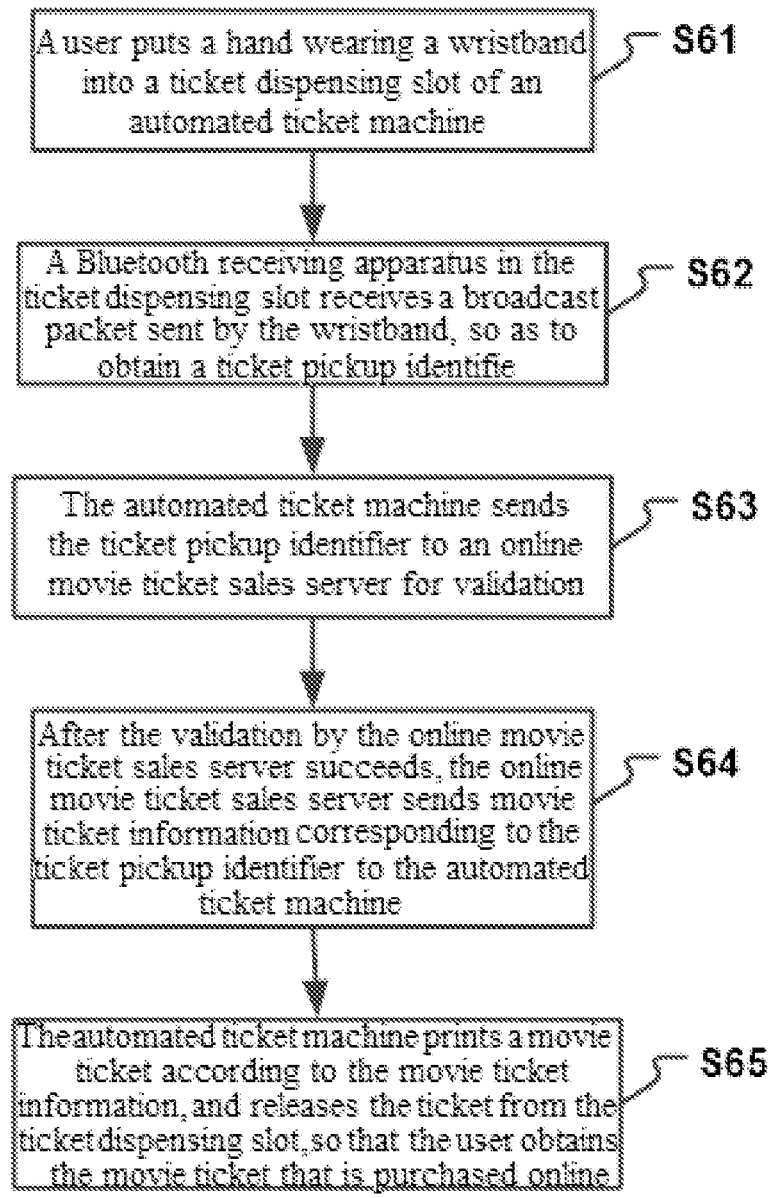
FIG. 6 is a flowchart of picking up a ticket from an automated movie ticket machine by using a wristband according to an implementation of the present disclosure.

As shown in FIG. 6, a process in which a user picks up a ticket from an automated movie ticket machine using a wristband is as follows.

At Step S61, a user puts a hand wearing a wristband into a ticket dispensing slot of an automated ticket machine.

At Step S62, a Bluetooth receiving apparatus in the ticket dispensing slot receives a broadcast packet sent by the wristband, so as to obtain a ticket pickup identifier.

At Step S63, the automated ticket machine sends the ticket pickup identifier to an online movie ticket sales server for validation.

At Step S64, after the validation by the online movie ticket sales server succeeds, the online movie ticket sales server sends movie ticket information corresponding to the ticket pickup identifier to the automated ticket machine.

At Step S65, the automated ticket machine prints a movie ticket according to the movie ticket information, and releases the ticket from the ticket dispensing slot, so that the user obtains the movie ticket that has been purchased online.

In this implementation, the ticket pickup operation is simple and quick for the user, who only needs to reach out and pick up the ticket, thereby saving time for the user. In addition, the user does not need to input the delivery code on the screen or photograph the two-dimensional code, and the purchased article need not be displayed on the screen, which can protect personal privacy to some extent in public places. Furthermore, the design of the dispensing slot is simple and interesting, such that it prevents interference between adjacent wearable devices.

It should be understood by a person skilled in the art that the implementations of the present disclosure may be provided as a method, system, or computer program product. Accordingly, the present disclosure may take the form of an entirely hardware implementation, an entirely software implementation, or an implementation combining software and hardware aspects. Furthermore, the present disclosure may take the form of a computer program product that is implemented on one or more computer-usable storage media (including but not limited to disk storage and optical storage) having program code usable by computers stored therein.

The present disclosure is described with reference to flowcharts and/or block diagrams of methods, apparatuses (systems) and computer program products according to the implementations of the present disclosure. It should be understood that each procedure and/or block of the flowcharts and/or block diagrams, and combinations of procedures and/or blocks in the flowcharts and/or block diagrams, can be implemented by computer program instructions. These computer program instructions may be provided to a processor of a general purpose computer, special purpose computer, embedded processing device or other programmable data processing apparatuses to produce a machine, such that the instructions, which are executed via the processor of the computer or other programmable data processing apparatuses, create means for implementing the functions specified in one or more procedures of the flowcharts and/or one or more blocks of the block diagrams.

These computer program instructions may also be stored in a computer-readable memory that can direct a computer or other programmable data processing apparatuses to function in a particular manner, such that the instructions stored in the computer-readable memory produce an article of manufacture, including instruction means that implement the functions specified in one or more procedures of the flowcharts and/or one or more blocks of the block diagrams.

These computer program instructions may also be loaded onto a computer or other programmable data processing apparatuses to cause a series of operational steps to be performed on the computer or programmable apparatuses to produce a computer implemented process such that the instructions which are executed on the computer or programmable apparatuses provide steps for implementing the functions in one or more procedures of the flowcharts and/or one or more blocks of the block diagrams.

Other solutions for implementing the present disclosure will be apparent to a person skilled in the art after considering this specification or practicing the disclosed invention. This application is therefore intended to cover any variations, uses, or adaptations of the present disclosure that are consistent with the general principles of the present disclosure and come within known or customary practice in the art that has not been disclosed in the present disclosure. The specification and implementations above are examples only.

It should be understood that the present disclosure is not limited to the accurate structures that have been described above and shown in the accompanying drawings, and various modifications or variations may be made without departing from the scope of the present disclosure.

What is claimed is:

1. An information exchange method for a delivery terminal, the method comprising:
    receiving, by a processor, a broadcast packet periodically sent within a preset location range via short range wireless communication, by a smart wearable device located inside a dispensing slot of the delivery terminal, wherein the broadcast packet comprises a delivery identifier of a commodity purchased by a user;
    blocking, by the processor, a broadcast packet sent by a different smart wearable device located outside the preset location range and the dispensing slot;
    parsing, by the processor, the broadcast packet to obtain the delivery identifier;
    transmitting, by the processor, the delivery identifier to a network side to validate the delivery identifier;
    acquiring, by the processor, commodity information corresponding to the delivery identifier based on a determination that the delivery identifier is valid; and
    dispensing, by the processor, a commodity corresponding to the commodity information.

2. The method according to claim 1, wherein dispensing a commodity corresponding to the commodity information comprises:
    dispensing, by the processor, the commodity corresponding to the commodity information within the preset location range.

3. The method according to claim 1, wherein the smart wearable device periodically sends the broadcast packet via Bluetooth.

4. An information exchange apparatus for a delivery terminal, comprising:
    a memory coupled to one or more processors configured to execute programmed instructions stored in the memory to:
        receive a broadcast packet periodically sent within a preset location range via short-range wireless communication, by a smart wearable device located inside a dispensing slot of the delivery terminal, wherein the broadcast packet comprises a delivery identifier of a commodity purchased by a user;
        block a broadcast packet sent by a different smart wearable device located outside the preset location range and the dispensing slot;
        parse the broadcast packet to obtain the delivery identifier;
        send the delivery identifier to a network side to validate the delivery identifier;
        acquire commodity information corresponding to the delivery identifier based on a determination that the delivery identifier is valid; and
        dispense a commodity corresponding to the commodity information.

5. The apparatus according to claim 4, wherein the dispensing module is configured to dispense the commodity corresponding to the commodity information within the preset location range.

6. A delivery terminal, comprising:
    a receiver configured to receive a broadcast packet periodically sent within a preset location range via short-range wireless communication, by a smart wearable device located inside a dispensing slot of the delivery terminal, wherein the broadcast packet comprises a delivery identifier of a commodity purchased by a user;
    a processor configured to execute instructions to:
        block a broadcast packet sent by a different smart wearable device located outside the preset location range and the dispensing slot;
        parse the broadcast packet to obtain the delivery identifier;
        send the delivery identifier to a network side to validate the delivery identifier; and
        acquire commodity information corresponding to the delivery identifier based on a determination that the delivery identifier is valid; and
    a dispensing slot configured to dispense a commodity corresponding to the commodity information.

7. The delivery terminal according to claim 6, wherein the receiver is located in the dispensing slot.

* * * * *